Feb. 26, 1946.   E. E. HARRINGTON   2,395,546
TURNBUCKLE SAFETY DEVICE
Filed Jan. 31, 1944
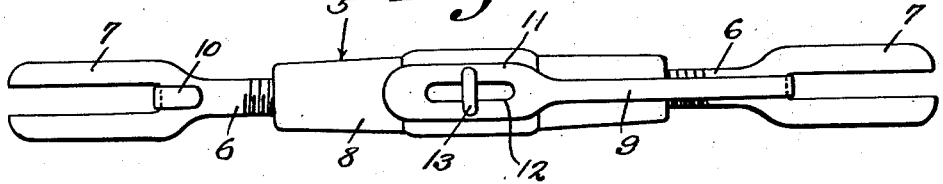
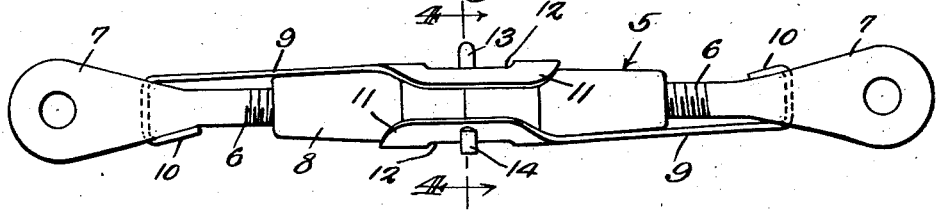
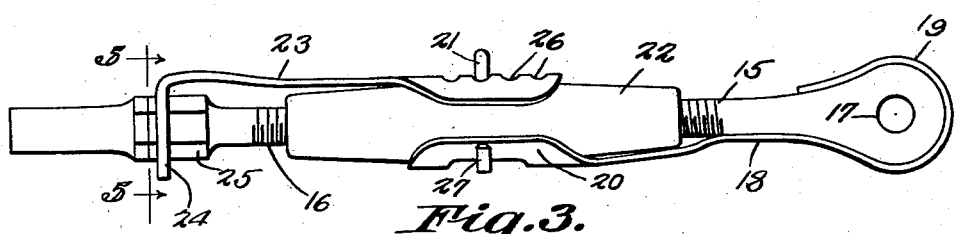
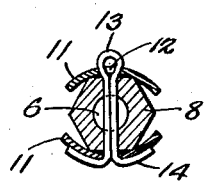 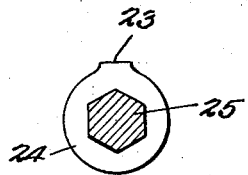
E. E. Harrington
INVENTOR.
BY
ATTORNEYS.

Patented Feb. 26, 1946

2,395,546

UNITED STATES PATENT OFFICE 2,395,546

TURNBUCKLE SAFETY DEVICE

Eber E. Harrington, Detroit, Mich.

Application January 31, 1944, Serial No. 520,468

6 Claims. (Cl. 287—60)

This invention relates to turnbuckles, and more particularly to a safety device used in conjunction with a turnbuckle, whereby the turnbuckle will be held in its positions of adjustment.

An important object of the invention is to provide a safety device which will be exceptionally strong but light in weight, to the end that the safety device will have unlimited use with turnbuckles of various sizes.

Still another object of the invention is to provide a safety device of this character which will be held on a turnbuckle at all times, eliminating any possibility of the safety device becoming detached from the turnbuckle.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a plan view of a turnbuckle equipped with a safety device constructed in accordance with the invention.

Figure 2 is a side elevational view thereof.

Figure 3 is a side elevational view of a modified form of safety device.

Figure 4 is a sectional view taken on line 4—4 of Fig. 2.

Figure 5 is a sectional view taken on line 5—5 of Fig. 3.

Referring to the drawing in detail, the turnbuckle is indicated generally by the reference character 5 and includes the threaded members 6 formed with clevis ends 7, the threaded sleeve 8 operating over the threaded members, to move the threaded members towards and away from each other, according to the direction of rotation of the sleeve 8.

The safety device used with this form of turnbuckle, includes a length of metal 9, one end thereof being extended laterally and rearwardly, as at 10 where it is extended through the clevis end of a threaded member 6, with which it is used.

The opposite end of the safety device is widened at 11 and formed with an elongated opening 12 through which a cotter key indicated at 13 is passed, the ends 14 of the cotter key being bent around the safety device, as shown by the drawing.

It will of course be understood that the safety device embodies two of these members 9, one to be connected with the clevis of each threaded member 6. The safety devices are positioned as shown by Fig. 2 of the drawing, in which case, the looped end of the cotter key 13 engages one of the widened portions 11, holding it in place.

In the form of the invention as shown by Fig. 3 of the drawing, the turnbuckle embodies threaded members 15 and 16, the threaded member 15 having an eye 17. In this case, the body portion of the safety device is indicated by the reference character 18 and has the end 19 thereof curved around the end of the threaded member 15. The opposite end of the safety device is widened at 20, and formed with an elongated opening to receive the cotter key 21 that extends through an opening of the sleeve 22 of the turnbuckle.

At the left side of Fig. 3, is illustrated another form of safety device which comprises the body portion 23 and a right-angled end portion 24, the right-angled end portion 24 being shaped to provide a socket to be fitted over the nut 25 of the threaded member 16. The opposite end of the body portion 23 is widened and formed with a plurality of openings 26 through which the cotter key 21 is passed. In this form of the invention the ends of the cotter key indicated at 27, are bent over the widened portion 20 of the safety device indicated by the reference character 18.

From the foregoing it will be seen that due to the construction shown and described, I have provided a safety device used in conjunction with a turnbuckle which will prevent rotary movement of the adjusting sleeve of the turnbuckle with which the safety device is used, after the sleeve has been properly adjusted or set to tighten the turnbuckle.

What is claimed is:

1. In a device of the class described, in combination, a turnbuckle sleeve, a turnbuckle shank adjustably threaded into said sleeve, an attenuated safety member extending longitudinally over said sleeve and said shank, the outer end of said member being capable of being bent into locking engagement with said shank, and a securing pin passing transversely through said sleeve and said member, said member having an enlarged portion marginally bent into extended engagement with said sleeve on opposite sides of said pin for maintaining said member in axial parallelism with the turnbuckle.

2. In a device of the class described, in combination, a turnbuckle sleeve, a turnbuckle shank adjustably threaded into said sleeve, an attenuated safety member extending longitudinally over said sleeve and said shank, the outer end of said member being capable of being bent into locking engagement with said shank, and a securing pin passing transversely through said sleeve and said member, said member having an enlarged portion of arcuate form in cross section providing extended engagement with said sleeve on opposite sides of said pin and capable of slight flexion under securing pressure applied to said pin.

3. In a device of the class described, in combination, a turnbuckle sleeve, turnbuckle shanks adjustably threaded into opposite ends of said sleeve, a pair of attenuated safety members extending in opposite directions and on opposite sides over said sleeve and said shanks, the outer ends of said members being capable of being bent into locking engagement with their respective shanks, and a securing pin passing transversely through said sleeve and said members, each of said members having an enlarged portion marginally bent toward the other to provide extended engagement with said sleeve on opposite sides of said pin for maintaining said members in relative axial parallelism.

4. In a device of the class described, in combination, a turnbuckle sleeve, turnbuckle shanks adjustably threaded into opposite ends of said sleeve, a pair of attenuated safety members extending in opposite directions and on opposite sides over said sleeve and said shanks, the outer ends of said members being capable of being bent into locking engagement with their respective shanks, and a securing pin passing transversely through said sleeve and said members, each of said members having an enlarged portion of arcuate form in cross section providing extended engagement with said sleeve on opposite sides of said pin and capable of slight flexion under securing pressure applied to said pin whereby said enlarged portions are drawn toward one another about said sleeve by said pin.

5. In a device of the class described, in combination, a turnbuckle sleeve, turnbuckle shanks adjustably threaded into opposite ends of said sleeve, a pair of attenuated safety members extending in opposite directions and on opposite sides over said sleeve and said shanks, the outer ends of said members being capable of being bent into locking engagement with their respective shanks, and a securing pin passing transversely through said sleeve and said members, each of said members having an enlarged portion marginally bent toward the other to provide extended engagement with said sleeve on opposite sides of said pin for maintaining said members in relative axial parallelism, the marginal portions of said two members being materially spaced from each other.

6. In a device of the class described, in combination, a turnbuckle sleeve, turnbuckle shanks adjustably threaded into opposite ends of said sleeve, a pair of attenuated safety members extending in opposite directions and on opposite sides over said sleeve and said shanks, the outer ends of said members being capable of being bent into locking engagement with their respective shanks, and a securing pin passing transversely through said sleeve and said members, each of said members having an enlarged portion of arcuate form in cross section providing extended engagement with said sleeve on opposite sides of said pin and capable of slight flexion under securing pressure applied to said pin whereby said enlarged portions are drawn toward one another about said sleeve by said pin, the marginal portions of said two members being materially spaced from each other.

EBER E. HARRINGTON.